Aug. 25, 1936.　　　　J. O. TOW　　　　2,051,919
PORTABLE IRRIGATION HYDRANT
Filed Feb. 1, 1936
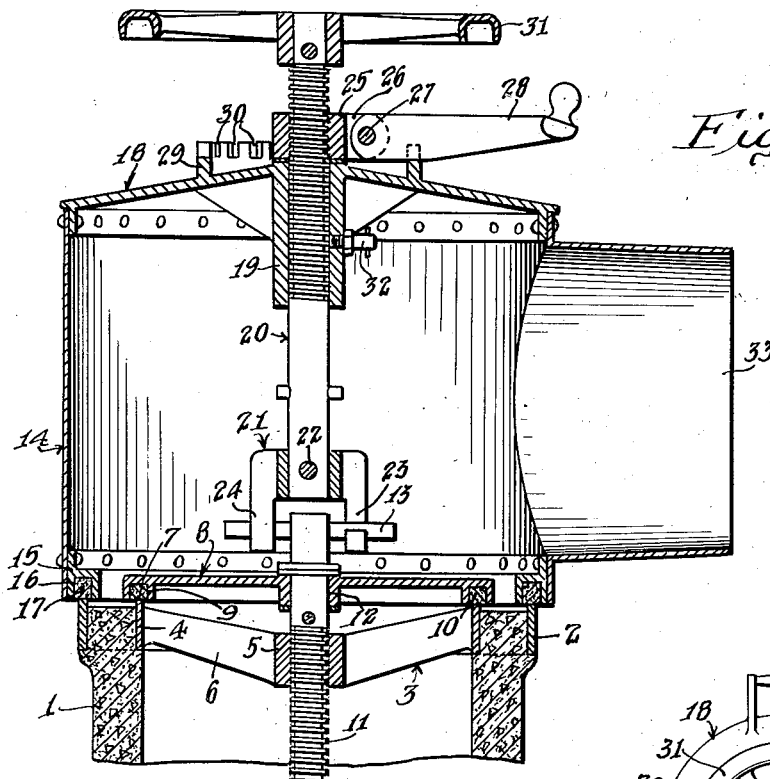
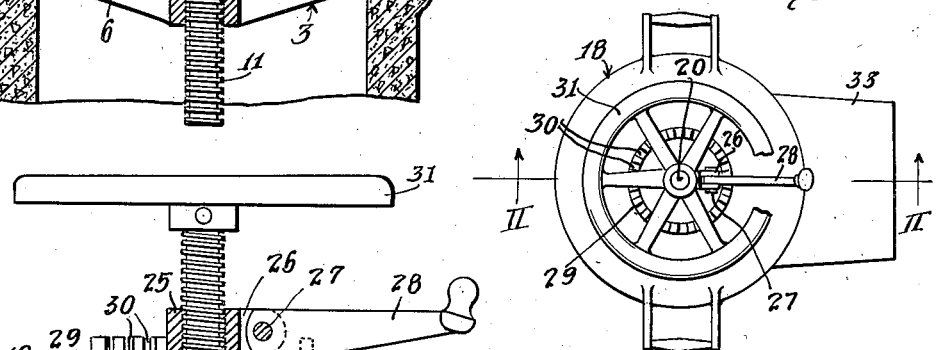
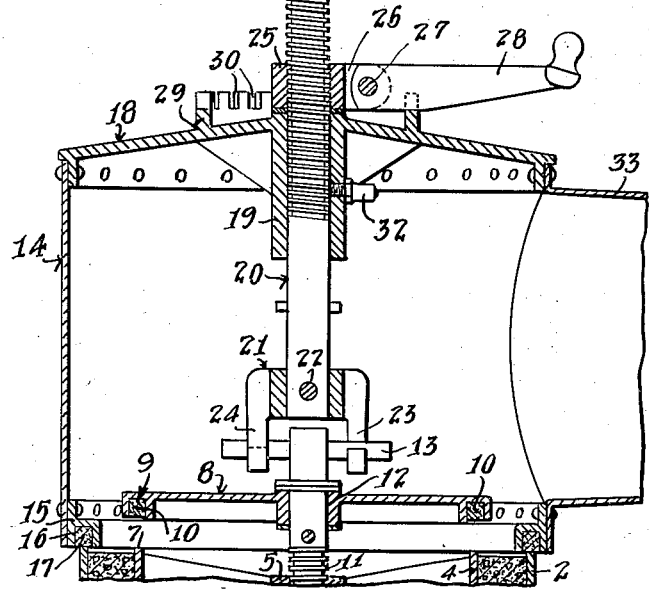
INVENTOR.
James Oliver Tow
By Lyon & Lyon
ATTORNEYS Patented Aug. 25, 1936

2,051,919

UNITED STATES PATENT OFFICE 2,051,919

PORTABLE IRRIGATION HYDRANT

James Oliver Tow, Los Angeles, Calif., assignor to Snow Manufacturing Co., Los Angeles, Calif., a corporation of California Application February 1, 1936, Serial No. 61,926

4 Claims. (Cl. 137—13)

My invention relates to irrigation systems and has particular reference to a portable hydrant which may be readily attached to or detached from irrigation outlets to convey water from such outlets to any desired portion of a field or orchard which is to be irrigated.

In certain types of irrigation systems the irrigation water is brought through mains lying below the level of the ground desired to be irrigated. Such mains are ordinarily provided at spaced intervals with upstanding outlets communicating with the main, but which outlets are ordinarily of such height as to just bring the upper surface of the outlet level with the surface of the ground, to thereby prevent interference between the same and tools which are used to cultivate the fields or orchards. Hence whenever it becomes necessary to irrigate the field it is essential that some device be attached to the upstanding outlet which will permit the water in the main to become elevated to a position above the ground level from which it may then be moved or passed by gravity to various portions of the field where irrigation is desired. Such devices are known as hydrants and consist ordinarily of a barrel or cylindrical shaped tank-like member having an open lower end which can be clamped upon the upper surface of the outlet and which has an outlet pipe connected usually in the side of the hydrant through which water may pass from the hydrant either directly to the field or to such leadoff pipes as may be required to transport the water to a particular section of the field where it is desired.

It is also the common practice to employ in each of the main-outlets a valve which closes the outlet but which must be opened at the time water is to be taken from the outlet through the hydrant. I have provided a portable hydrant which may be transported from place to place throughout the fields, and may be readily attached to any one of the main-outlets by merely detachably hooking the valve operating the mechanism of the hydrant to the valve of the main outlet.

An object of my invention is to provide a hydrant of the character set forth wherein the hydrant is provided with a handle and screw valve opening and closing mechanism, the screw thereof having the same lead of threads as the threads on the main-outlet valve, whereby the valve-operating screw may be used as a clamp to clamp or seal the portable hydrant in water-tight relation upon the main-outlet.

Another object of the invention is to provide a portable hydrant adapted to be readily attached to and detached from any one of a number of main-outlets and in which the valve operating mechanism for operating the valve of the main-outlet is also employed as the means for clamping the hydrant to the main-outlet and wherein an auxiliary nut is provided upon the valve operating mechanism which may be screwed down thereon to achieve the clamping operation.

Other objects and advantages will be apparent from a study of the following specifications, read in connection with the accompanying drawing, wherein Figure 1 is a plan view of a portable hydrant constructed in accordance with my invention;

Fig. 2 is a vertical sectional view, taken along line II—II of Fig. 1; and

Fig. 3 is a vertical sectional view similar to Fig. 2, illustrating the main-outlet valve in open position.

Referring to the drawing, I have illustrated an upstanding section of pipe 1 which constitutes the main-outlet and this pipe is ordinarily constructed of concrete, or similar material, and usually has about its outer periphery a band 2 of iron or steel, or similar material, which acts as a metal seal upon which a portable hydrant may be clamped, as will be hereinafter more fully described.

Also rigidly secured within the interior upper edge of the main-outlet 1 is a spider 3 usually consisting of an annular ring 4 of metal to which is secured a hub 5 located concentrically of the annular ring 4 by means of two or more arms 6 preferably cast integrally with the hub 5 to the annular ring 4. The upper edge 7 of the annular ring 4 preferably projects above the upper edge of the main-outlet 1 to form a metal sealing surface against which a valve 8 may bear to close off the main-outlet against the passage of water, when so desired.

The valve 8 usually consists of a disk of metal having an annular recess 9 extending about the periphery thereof to receive a strip 10 of packing material, such strip being held in alignment with the edge 7 of the annular ring 4 in such position that when the valve disk is screwed down or clamped down upon the main-outlet the packing 10 will form a water-tight seal with the ring 4.

The valve 8 is operated between its closed and its open positions, as shown in Figs. 2 and 3, respectively, by means of a screw 11 rotatably secured at the center of the valve disk 8 as indicated at 12. The screw 11 is threaded into the hub 5 with threads of a predetermined lead, while the upper end of the screw 11 is provided with a handle 13 by which the screw 11 may be rotated in one direction to open the valve, or in the opposite direction to close the valve.

My portable hydrant which is adapted to be detachably placed upon the main-outlet 1, consists essentially of a cylindrical hydrant body drum 14, the lower end of which is provided with an annular flange 15 having a recess 16 therein containing a strip of packing 17 adapted to seat upon the exterior ring 2 of the main-outlet 1. The upper end of the cylindrical body drum 14 is closed by a hood or cover 18 which is preferably cast with a concentric boss 19 extending downwardly from the hood 18 and has an internal bore exactly equal to the exterior diameter of the stem of a handle member 20. The stem of the handle member 20 is provided with threads throughout a considerable portion of its length, the pitch of which threads is exactly equal to the pitch of the threads on the valve operating screw 11, to such position that when the hydrant is placed upon a main-outlet the lower end of the stem handle member 20 will lie immediately above the valve operating screw 11. The lower end of the stem handle member 20 is provided with a hook 21 preferably formed as a relatively U-shaped piece of metal pinned, as at 22, to the stem of the handle member 20 and having a pair of downwardly extending fingers 23 and 24 adapted to engage below the handle bar 13 of the valve operating screw 11.

A nut 25 is threaded upon the stem of the handle member 20 above the hood 18 so that by engaging the fingers 23 and 24 below the handle bar 13 and screwing down the nut 25 the hydrant drum will be clamped down upon the main-outlet in water-tight sealing engagement therewith without the necessity of rotating the stem of the handle member 20. Thus it will be observed that without any turning movement of the valve operating screw 11 the hydrant member may be clamped tightly upon the main-outlet. The nut 25 is provided with a pair of outstanding ears 26 in which is pivoted, as at 27, a nut operating handle 28 consisting essentially of an elongated narrow bar while the hood 18 is preferably formed with an upstanding crown 29 having a plurality of teeth or serrations 30 in which the handle 28 may be seated after the nut 25 has been rotated around the stem of the handle member 20 sufficiently to tighten the hydrant in place. Thus the nut, once tightened, will be held against rotation relative to the hydrant body 14, though the stem of the handle member 20 may be freely rotated in either direction through the nut 25 to operate the valve screw 11. A handwheel 31 is preferably provided upon the upper end of the stem of the handle 20 to facilitate rotation of the stem of the handle member 20 whenever it is desired to open or close the valve 8.

A lubrication fitting 32 may be provided upon the boss 19 to permit lubricant to be admitted into the boss 19 to allow the ready movement of the handle member 20 relative to the boss, and further prevents water seepage around the handle member 20.

At one or more sides of the drum 14 a water outlet 33 may be provided, such outlet being preferably of large diameter and adapted to receive thereon pipe or conduits which may lead the water from the hydrant to any desired portion of the fields.

It will be observed, therefore, that I have provided a portable hydrant which consists essentially of a drum adapted to be sealed upon a main-outlet and in which the same operating handle or screw which is employed to open and close the valve of the main-outlet is also employed as the means for clamping the hydrant in place. By making the lead of the threads of the handle member 20 exactly the same lead as the threads of the valve operating screw 11, it will be apparent that once the hydrant has been clamped in position every rotation of the handle member 20 to move the valve 8 will leave the hood 18 of the hydrant and the top of the main-outlet in exactly the same spaced relation. In other words, though the handle 20 may be rotated to move upwardly in the hood, the screw 11 moves upwardly relative to the main-outlet by exactly the same amount.

While I have shown and described the preferred embodiment of my invention, I do not wish to be limited to any of the details of construction shown herein, except as defined in the appended claims.

I claim:

1. In a portable hydrant for detachable connection to a main-outlet having a valve and a screw for moving said valve between open and closed positions, a hydrant body having means on its lower end for engaging the upper end of said main-outlet to form a water-tight seal therewith, means for clamping said hydrant body on said main-outlet including a valve operating stem extending through said hydrant body and having means on its lower end for engaging the screw of said valve and a nut on said handle member above said hydrant body threadedly engaging said handle member with threads of the same lead as the threads of said valve operating screw, means for rotating said nut relative to said handle member to clamp said hydrant body on said main-outlet, means for holding said nut in any position relative to said hydrant body whereby when said nut clamps said body on said main-outlet rotation of said handle member will operate said valve without disturbing the clamping relation of said body on said main-outlet.

2. In combination with a main-outlet of an irrigation system having a valve for opening and closing the same and a screw for operating said valve between its open and closed positions, a hydrant body having means at its lower end for forming a water-tight seal with said main-outlet, a single handle member having means at its lower end for engaging the screw of said valve and having a nut threadedly engaging said handle member above said hydrant body with threads of the same lead as the threads of said valve-operating screw whereby said nut may be screwed down on said hydrant body and thereafter the rotation of said handle member will operate said valve screw without changing the clamping relation of said hydrant body and said main-outlet.

3. In combination with a main-outlet of an irrigation system having a valve for opening and closing the same and a screw for operating said valve between its open and closed positions, a hydrant body having means at its lower end for forming a water-tight seal with said main-outlet, a stem passing down through said hydrant body, hook means on the lower end of said stem for engaging said valve-operating screw, a nut threaded on said stem above said hydrant body with threads having the same lead as the threads of said valve operating screw and rotatable independently of said hydrant body to move along said stem to clamp said hydrant body on said main-outlet, and means for fixing said nut against rotation relative to said hydrant body after said hydrant body has been clamped in place, whereby subsequent rotation of said stem will move said stem through said nut at the same rate as said valve-operating screw moves relative to said main-outlet.

4. In combination with a main-outlet of an irrigation system having a valve for opening and closing the same and a screw for operating said valve between its open and closed positions, a hydrant body having means at its lower end for forming a water-tight seal with said main-outlet, a hood forming the top of said hydrant body and having a boss extending downwardly therefrom in alignment with the valve operating screw, a stem passing down through the boss and having at its lower end a hook for engaging the valve operating screw, a nut threaded upon the upper end of said stem above said hood by threads having the same lead as the threads of said valve operating screw to move down along said stem to clamp said body on said main-outlet, and means on said hood engageable with said nut to hold said nut against rotation relative to said body after said body is clamped in place, whereby subsequent rotation of said stem will move said valve operating screw vertically in said hydrant body at the same rate and in the same direction as said stem moves through said hood.

JAMES OLIVER TOW.